United States Patent
Hourunranta et al.

(10) Patent No.: US 6,959,020 B1
(45) Date of Patent: Oct. 25, 2005

(54) ERROR DETECTION IN RECEIVING MULTIPLEX SIGNALS

(75) Inventors: Ari Hourunranta, Tampere (FI); Miska Hannuksela, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/337,916

(22) Filed: Jun. 22, 1999

(30) Foreign Application Priority Data

Jun. 30, 1998 (FI) .................................. 981507

(51) Int. Cl.$^7$ .............................................. H04J 3/02
(52) U.S. Cl. .................................................... 370/542
(58) Field of Search ................. 370/242–244, 370/389, 393, 470–471; 714/752, 701, 799, 714/758, 21, 25, 48–50, 52, 57, 755, 824

(56) References Cited

U.S. PATENT DOCUMENTS

| | | | | |
|---|---|---|---|---|
| 5,414,707 A | * | 5/1995 | Johnston et al. | 370/395.6 |
| 5,467,342 A | * | 11/1995 | Logston et al. | 370/253 |
| 5,483,287 A | * | 1/1996 | Siracusa | 375/240.26 |
| 5,487,061 A | * | 1/1996 | Bray | 370/252 |
| 5,878,041 A | * | 3/1999 | Yamanaka et al. | 370/395.65 |
| 5,956,102 A | * | 9/1999 | Lane | 348/425.4 |
| 6,026,506 A | * | 2/2000 | Anderson et al. | 714/746 |
| 6,034,968 A | * | 3/2000 | Park et al. | 370/465 |
| 6,072,771 A | * | 6/2000 | Anderson et al. | 370/216 |
| 6,272,178 B1 | * | 8/2001 | Nieweglowski et al. | 375/240.03 |
| 6,310,897 B1 | * | 10/2001 | Watanabe | 370/522 |
| 6,356,567 B2 | * | 3/2002 | Anderson et al. | 370/516 |
| 6,404,776 B1 | * | 6/2002 | Voois et al. | 370/468 |

FOREIGN PATENT DOCUMENTS

EP  0 806 873 A2  11/1997

OTHER PUBLICATIONS

ITU-T Recommendation H.223 Series H: Transmission of Non-Telephone Signals "Multiplexing protocol for low bit rate multimedia communication".

* cited by examiner

*Primary Examiner*—Chi Pham
*Assistant Examiner*—Thai Hoang
(74) *Attorney, Agent, or Firm*—Perman & Green

(57) ABSTRACT

A method in reception of a multiplex signal, comprising one or more data units, and at least one framing data block in each multiplex signal. The method comprises: searching for said framing data block from a received multiplex signal; demultiplexing said one or more data units according to the information in said framing data block; generating one or more demultiplexed signals from said demultiplexed data units, and forwarding said demultiplexed signals for decoding (50). At multiplexing possible invalidity of demultiplexed video data units is detected (51), and as a response to a detected invalidity in a demultiplexed video data unit, an error indication to the demultiplexed video data signal is added (52).

38 Claims, 4 Drawing Sheets

ERROR DETECTION IN RECEIVING MULTIPLEX SIGNALS

FIELD OF THE INVENTION

The present invention relates to a method, device and system in reception of a multiplex signal, comprising one or more data units, including a video data unit, and at least one framing data block in each multiplex signal, the framing data block carrying information on the configuration of the data units in said multiplex signal. The method comprises searching for said framing data block from a received multiplex signal; demultiplexing said one or more data units according to the information in said framing data block; generating one or more demultiplexed signals, including a video data signal, from said demultiplexed data units, and forwarding said demultiplexed signals for decoding.

BACKGROUND OF THE INVENTION

One of the recent targets in telecommunications has been to provide systems, where good quality, real-time transmission of video, audio and data is available. Transmission of video is formed by a continuous stream of data carrying moving pictures. As is generally known, the amount of data needed to transfer pictures is high compared to many other types of media, and so far usage of video in low bit rate terminals has been negligible. Transmission of data in digital form, anyhow, has provided for increased signal to noise ratios and increased information capacity along the transmission channel. In the near future advanced digital mobile telecommunication systems will also be introducing services enhancing the transmission bit rates, which means that transmission of video even over low bit rate mobile channels will soon become more feasible.

In circuit switched multimedia transmission, bit streams from sender's different media sources (e.g. video, audio, data and control) are multiplexed into a single bit stream, and at the receiving end the bit stream is again demultiplexed into various multimedia streams to be decoded appropriately. Since the bit streams from and to different sources are not equal in size, the multiplexing usually also comprises logical framing. This means that the multiplex signal to be transmitted is structured according to a chosen control protocol, and framing data blocks (e.g. bits, flags, etc.) are inserted to identify different data blocks.

The basic principle of the multiplexing scheme is illustrated with the block diagram of FIG. 1. It is to be noted that the figure merely illustrates the basic concepts and comprises no implications on actual sizes, numbers or order of the transmitted packet. In this example data packets from two different media sources are first multiplexed for transmission and after transmission demultiplexed for forwarding to different decoders. Data packets A1, A2, A3, . . . from the audio encoder and data packets V1, V2, . . . . from the video encoder are combined in the multiplexer MUXX into consecutive packet data units PDU1 (step 1) and PDU2 (step 2). Since video packets V1 and V2 are large, they are broken into segments e.g. V->>V1.1/V1.2 for transmission. The demultiplexer adds a framing data block F to each of the PDUs, to indicate the boundaries and the structure of the contents of the PDUs. In the demultiplexer DMUX, data packets A1, A2, A3, . . . and V1, V2, . . . . are separated from the PDUs according to the information given in the framing data block F, and forwarded as data signals dA1, dV1, . . . to relevant decoders. Segmented video data units V1.1/V1.2 will first be combined to single video data packets (e.g. V1), and then forwarded to the video decoder.

For optimization of channel capacity usage, signals are generally compressed before transmission. This is especially important with video transmission, where the amount of data to be transmitted is large. Compressed video, anyhow, is easily afflicted by transmission errors, mainly for two reasons. Firstly, compressed video coding is based on predictive differential coding, in which a sampling system is used and the value of the signal at each sample time is predicted to be a particular linear function of the past values of the quantized signal. This causes propagation of errors, both spatially and temporally, which means that once an error occurs, it is easily visible for the human eye for a relatively long time. Especially susceptible are transmissions at low bit rates, where there are only a few intra-coded frames, which would stop the temporal propagation. Secondly, information symbols in compressed video are coded mainly using variable length codes, which also increases the susceptibility to errors. When a bit error alters the codeword to another one of different length, the decoder will lose synchronization and also decode consecutive error free blocks incorrectly until the next synchronization code.

To limit the degradations on the images introduced by transmission errors, error detection and/or error correction methods can be applied, retransmissions can be used, and/or effects from the received corrupted data can be concealed. Normally retransmission provides a reasonable way to protect data streams from errors, but big round-trip delays associated with low bit rate transmission and moderate or high error rates make it practically impossible to use retransmission, especially with real-time videophone applications. Error detection and correction methods usually require a large overhead since they add some redundancy to the data. Consequently, for low bit rate applications, error concealing can be considered as a preferred way to protect and recover images from transmission errors.

To be able to conceal transmission errors, they have to be detected and localized. The more is known of the type and the location of the error, the better the concealment method can be focused to the problem, and accordingly the better image quality will be achieved. The video reception process provides different methods of error detection, associated with different protocol layers of video transmission, as illustrated in FIG. 2. The channel coding layer 20 provides means for detecting, as well as correcting errors in received bit streams. The transmission protocol layer 22 usually comprises a CRC (Cyclic Redundancy Check) which is run for received video signals, on the basis of which incorrect signals can be rejected. In the video decoding layer 24 errors are usually detected as illegal variable-length codes or incorrectly positioned synchronization codes. Some errors can be detected and corrected even from the decoded images in the picture layer 26. The error concealment method can utilize error data from any or each of these layers. In this application, anyhow, error detection in the demultiplexing phase is examined with more precision.

For receiving video data, the received synchronous bit stream is forwarded to a demultiplex protocol unit for demultiplexing, logical framing, sequence numbering, error detection and error correction by means of retransmission, as appropriate to each media type. The demultiplexed bit streams are forwarded to appropriate decoders, which carry out redundancy reduction coding and decoding for said demultiplexed bit streams.

The multiplexing protocol for low bit rate multimedia communication over highly error-prone channels is described in ITU-T recommendation H.223. The multiplex consists of a multiplex layer and an adaptation layer. The multiplex layer mixes the various logical channels into a single bit stream. It transfers logical channel information in packets, delimited by a flag. A flag can be a HDLC (High-Level Data Link Control) flag, with which HDLC zero-bit insertion for transparency is also used. It is also possible to use PN framing where the flag is a 16-bit pattern as described in annexes A, B, and C of H.223. Each data packet contains a one-octet header followed by a variable number of information field octets. The header octet includes a multiplex code, which specifies, by reference to a multiplex table, the mapping of the information field octets to various logical channels. Each data packet may contain a different multiplex code, and therefore a different mix of logical channels. The multiplex layer does not perform error control, except for a CRC (Cyclic Redundancy Check) on the header octet.

The adaptation layer handles error control and sequence numbering, as appropriate to each information stream. Specification H.223 defines three adaptation layers AL1, AL2, and AL3, where AL3 is intended primarily for digital video. AL3 includes a 16 bit CRC for error detection, by which the transmission errors can be localized to a single AL3 layer packet. In the specification of the adaptation layers, it is also mentioned that such error indications could be passed from a video demultiplexer to a video decoder, but actual procedures for implementing such demultiplexer indications are not presented.

An indication of the possible error in the received packet is useful in many cases, especially if retransmission is possible. Anyhow, in low bit rate video transmission the amount of information contained in one video packet has to be large in order to limit the amount of bits used for framing and redundancy. This means, that the information about possible errors in the packet per se is not very useful, since in many cases by rejecting the whole video packet too much information will be lost which may lead to inadequate picture quality.

SUMMARY OF THE INVENTION

It is an object of the present invention to overcome, or at least mitigate the problems encountered in transmission of video over low bit rate channels, and to offer an improved method and apparatus for demultiplexing a received multiplex signal.

This object will be achieved by a method according to claim 1 comprising detecting at demultiplexing a possible invalidity of a demultiplexed video data unit; and adding, as a response to a detected invalidity in a demultiplexed video data unit, an error indication to the demultiplexed video data signal.

Another aspect of the invention is a device according to claim 12 for demultiplexing a multiplex signal, comprising one or more data units, including a video data unit, and at least one framing data block in each multiplex signal, the framing data block carrying information on the configuration of the data units in said multiplex signal. Said device comprises means for searching for said framing data block in a received multiplex signal; means for demultiplexing said one or more data units according to the information in said framing data block; means for generating demultiplexed signals from said demultiplexed data units, means for forwarding said demultiplexed signals for decoding. Said device is characterized in that said device further comprises means for detecting at demultiplexing a possible invalidity of a demultiplexed video data unit and means for adding, as a response to a detected invalidity in a demultiplexed video data unit, an error indication to the demultiplexed video data signal.

Another aspect of the invention is a multimedia terminal according to claim 13 for demultiplexing a multiplex signal, comprising one or more data units, including a video data unit, and at least one framing data block in each multiplex signal, the framing data block carrying information on the configuration of the data units in said multiplex signal, said device comprising means for searching for said framing data block in a received multiplex signal; means for demultiplexing said one or more data units according to the information in said framing data block; means for generating demultiplexed signals from said demultiplexed data units, and means for forwarding said demultiplexed signals for decoding. Said system is characterized in that said device further comprises means for detecting at demultiplexing possible a invalid invalidity of a demultiplexed video data unit and means for adding, as a response to a detected invalidity in a demultiplexed video data unit, an error indication to the demultiplexed video data signal.

This and other objects are achieved by checking the validity of demultiplexed video data blocks during the demultiplexing phase. Whenever the demultiplexer detects an error, an error indication is added to the video packet, and preferably an indication of the location of the detected error. The video packet is forwarded to the decoder to be used for further error concealment.

BRIEF DESCRIPTION OF THE DRAWINGS

The invention will now be described, by way of example only, with reference to the accompanying figures, of which.

DETAILED DESCRIPTION

Figure 3:
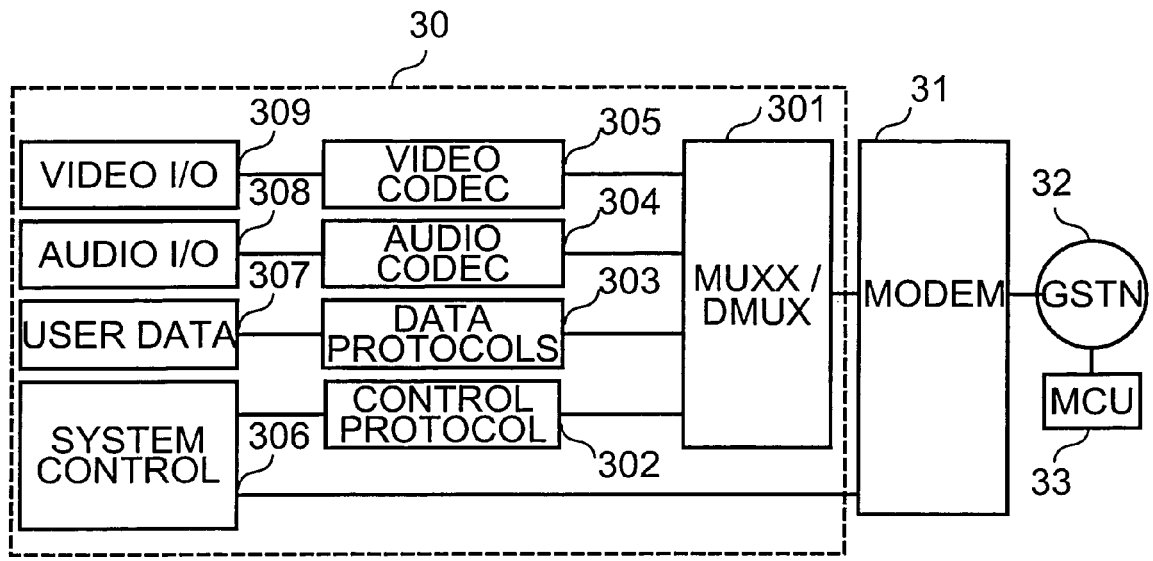
FIG. 3 illustrates a generic H.324 multimedia videophone system (prior art)

Notwithstanding other forms of the invention, preferred embodiments thereof will be described in connection with, and using the terminology of H.324 and other associated recommendations for multimedia communication terminals. The functional block diagram of FIG. 3 illustrates a generic H.324 multimedia videophone system. It consists of a terminal unit 30, a GSTN (General Switched Telephone Network), a modem 31, a GSTN network 32, and a multipoint control unit (MCU) 33. H.324 implementations are not required to have each functional element. Mobile terminals may be implemented with any appropriate wireless interface in place of the V.34 modem (H.324 Annex C).

The MCU 33 works as a bridge, that centrally directs the flow of information in the GSTN network 32 to allow communication among several terminal units 30. The modem 31 converts the synchronous multiplexed bit stream into an analog signal that can be transmitted over the GSTN, and converts the received analog signal into a synchronous bit stream that is sent to the multiplex/demultiplex protocol unit 301 of the terminal 30. The Multiplex protocol multiplexes transmitted video, audio, data and control streams into a single bit stream, and demultiplexes a received bit stream into various multimedia streams. In addition, it performs logical framing, sequence numbering, error detection, and error correction by means of retransmission, as appropriate to each media type. The control protocol 302 of the system control 306 provides end-to-end signaling for operation of the multimedia terminal, and signals all other end-to-end system functions. It provides for capability exchange, signaling of commands and indications, and messages to open and fully describe the content of logical channels. The data protocols 303 support data applications 307 such as electronic whiteboards, still image transfer, file exchange, database access, audiographics conferencing, remote device control, network protocols etc. The audio codec 304 encodes the audio signal from the audio I/O equipment 308 for transmission, and decodes the encoded audio stream. The decoded audio signal is played using audio I/O equipment. The video codec 305 carries out redundancy reduction coding and decoding for video streams to and from the video I/O equipment 309.

Figure 4:
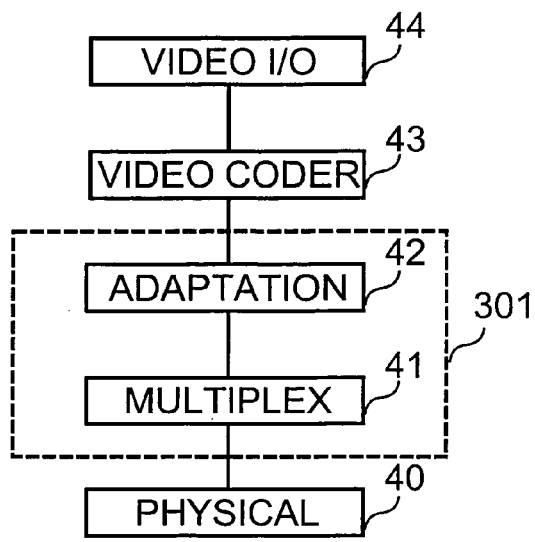
FIG. 4 shows a protocol stack used in video transmission.

A protocol stack used in video transmission is shown in FIG. 4. The multiplexer 301 comprises two distinct layers: a multiplex layer (MUX) 41 and an adaptation layer (AL) 42. The multiplex layer 41 is responsible for transferring information received from the AL to the far end using the services of an underlying physical layer 40. The MUX layer exchanges information with the AL in logical units called MUX-SDUs (Service Data Unit). A MUX-SDU always contains an integral number of octets that belong to a single logical channel. MUX-SDUs typically represent information blocks, whose start and end points mark the location of fields, which need to be interpreted in the receiver. MUX-SDUs are transferred by the MUX layer to the far end in one or more variable-length packets called MUX-PDUs (Packet Data Unit).

The unit of information exchanged between the AL and the higher-layer AL users is an AL-SDU. AL-SDUs contain an integer number of octets. The AL adapts AL-SDUs to the MUX layer by adding, where appropriate, additional octets for purposes such as error detection, sequence numbering and retransmission. The information unit exchanged between peer AL entities is called an AL-PDU. An AL-PDU is conveyed as one MUX-SDU. Three different types of ALs are specified and AL3 is designed primarily for the transfer of digital video. AL3 receives information from its higher layer (e.g. video encoder) in variable length AL-SDUs, and passes these to the MUX layer in MUX-SDUs, after adding two octets for 16-bit CRC, and optionally adding 1 or 2 control octets.

All MUX-PDUs are framed, which means that they are preceded and followed by a flag. At least two different framing flags are used. In HDLC-type framing, the flag consists of a unique bit pattern "01111110". Receivers of packets accommodate receipt of more than one consecutive flag, as the flag may be transmitted repetitively between MUX-PDUs. A transmitter of a packet examines the MUX-PDU content between flags, and inserts a "0" bit after all sequences of five contiguous "1" bits to ensure that a flag is not simulated within the MUX-PDU. The receiver shall examine the received bit stream between the opening and closing flags and shall discard any "0" bit which directly follows a sequence of five contiguous "1" bits. H.223 Annexes A, B, and C give a possibility to replace HDLC framing by PN (not an acronym) framing. In that case, packets are delimited by 16- (or 32) bit patterns. The PN flags are not unique bit patterns, i.e., similar bit patterns can also occur inside the MUX-PDU payload. Since the framing does not change the contents of MUX-PDU, the correct framing flags should be octet aligned, which reduces the probability of fake flag detection.

A MUX-PDU packet contains an octet long header, which comprises a one-bit Packet Marker field (PM) (or a one's complemented synchronization flag in PN framing), a four-bit Multiplex Code field (MC), and a three-bit Header Error Control field (HEC). The MC field specifies to which logical channel each octet of the MUX-PDU information field belongs, and the HEC field provides error detection capabilities over the MC field using a 3-bit CRC. Receivers usually discard MUX-PDUs whose HEC fields fail the error check. H.223 Annex B defines a longer header format for MUX-PDUs, which consists of a 4-bit MC field, 8-bit packet length field, and 12-bit Golay check symbols field. Golay check symbols can be used to detect errors, and even to correct up to 3 bit errors. Since there is no more room for a PM bit in the header, PM is indicated in H.223 Annex B by a one's complemented framing flag.

Figure 1:
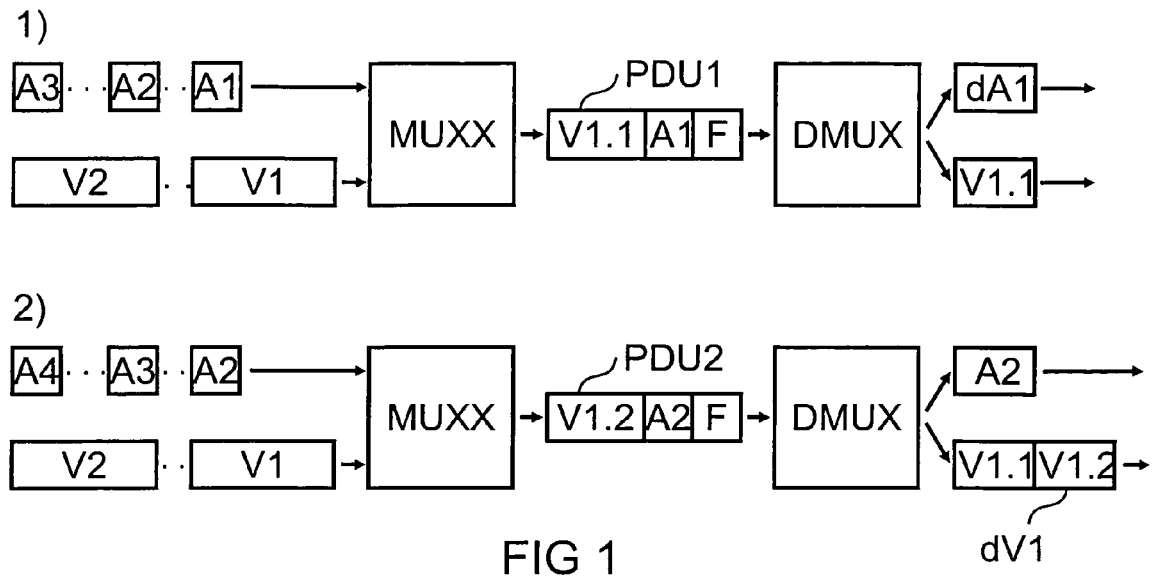
FIG. 1 illustrates the basic principle of the multiplexing scheme (prior art)
Figure 2:
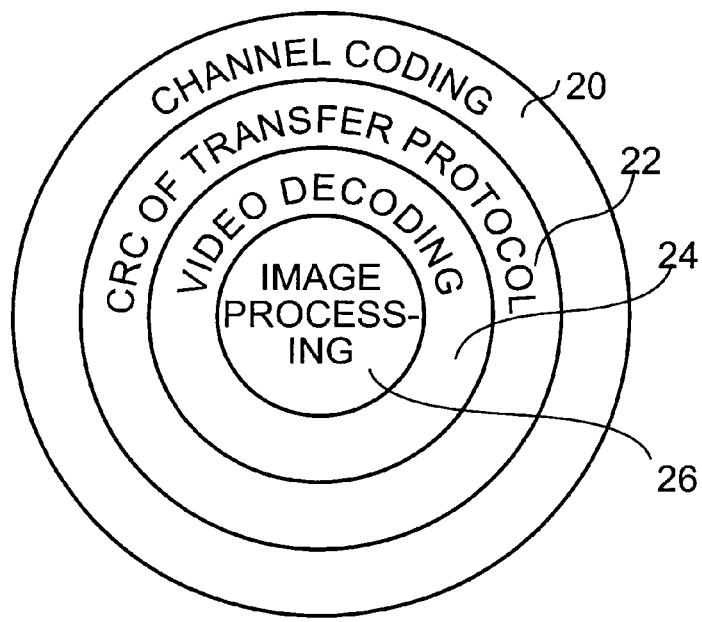
FIG. 2 illustrates different protocol layers of video transmission (prior art)
Figure 5:
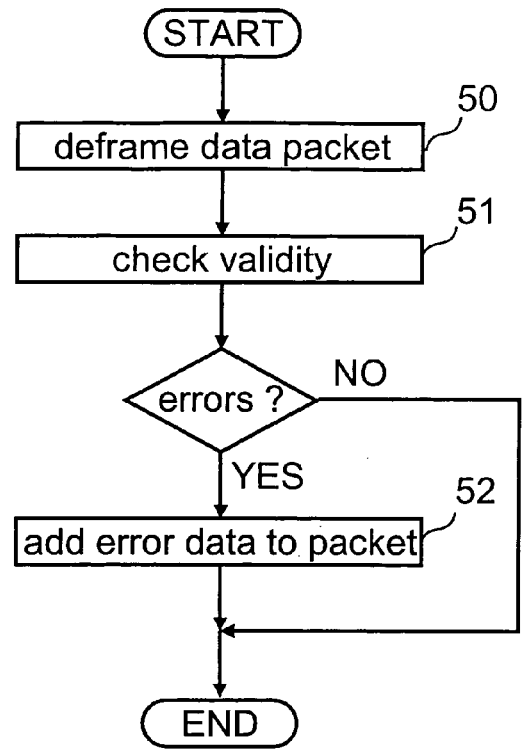
FIG. 5 illustrates the principle of the invented method implemented in the demultiplexer of a multimedia terminal.

Using the terms of described prior art, the block diagram of FIG. 5 illustrates the principle of the invented method implemented in the demultiplexer of a multimedia terminal. A more detailed description will be given in connection with following preferred embodiments. Each received data packet is deframed (step 50) i.e. the packet structure is analyzed to find a protocol-specific delimiter (F in FIG. 1) used to define boundaries between data blocks. Possible errors encountered during deframing are examined (step 51) and error data indicating the type of found error and estimated location of the error is added to said data packet (step 52). If no errors are detected during deframing, no further error data is added to the data packet.

In the embodiment described herein, the deframing process comprises at least searching for the HDLC flags from the bit stream. According to the invention, the demultiplexer is arranged to recognize certain errors that can be detected during deframing, and conclude the approximate location of erroneous bits. This will be further described in later paragraphs. Whenever such an error is detected, error data indicating the type of the error and the approximate location of erroneous bits is forwarded to the decoder. In the preferred embodiment this is done as side information in the AL-SDU, but other means of indication e.g. inclusion of error indication to the AL-SDU are possible. The decoder is forwarded a packet comprising the following information: video data, length of the packet, error information, error type, and a table of error locations and segment boundaries (the order and content of the error indication can be chosen according to the application). The decoder can then be adapted to utilize this information to recover from transmission errors in the decoding phase.

Figure 6:
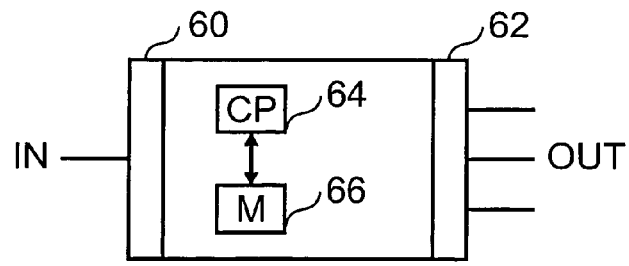
FIG. 6 shows a functional block diagram of a demultiplexer according to the invention.

FIG. 6 shows a functional block diagram of a demultiplexer according to the invention. The demultiplexer comprises an input port 60 for receiving a multiplex signal in a transmission channel, and an output port 62 comprising several outputs for forwarding demultiplexed signals to different decoding elements. The demultiplexer also comprises a processor 64 for at least checking the redundacy of the headers of the received multiplex signals, separating data packets associated with different media types, checking the redundancy of the separated data packets, and compiling data signals to be forwarded to the decoder. The memory 66 comprises at least an volatile memory for saving data during the multiplexing process.

In the following, some methods for checking the validity of the demultiplexed video packet during demultiplexing, and the ways of estimating the location of corresponding erroneous bits, are presented for the described H.223 based embodiment. Further technical details can be found in the ITU-T specification H.223 "Multiplexing protocol for low bit rate multimedia communication". Some methods are based on a search for the HDLC flag and some methods apply both to the HDLC framing and the PN framing. Corresponding error detection methods can, however, be developed for other types of errors as well as for other types of framing protocols. Error detection according to the invention comprises at least one such method, but can consist of any combination of available methods.

In many cases the location of the error is implicitly indicated by the analysis itself, or the location can be derived by analyzing deframing data combined from several contiguous packets. In case the CRC check in AL indicates errors, but the location of erroneous bits cannot be estimated, e.g. because the demultiplexer does not recognize the type of the error which it has detected, a general error indication, e.g. GENERAL_ERROR (not shown) is forwarded to the decoder.

Method 1.

Figure 7:
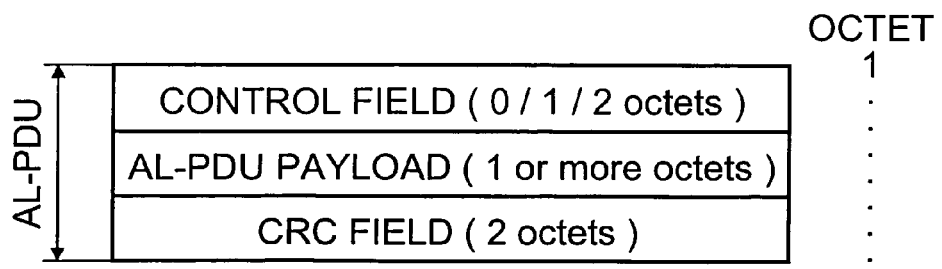
FIG. 7 illustrates a configuration of a Protocol Data Unit of AL (AL-PDU)

As mentioned before and illustrated in FIG. 7, an AL-PDU can contain an optional control field of 0,1 or 2 octets, a variable length AL-PDU payload field, and a CRC field for 16-bit CRC error detection. The control field contains a sequence number (SN) field, with the help of which the AL3 receiver may detect that a whole AL-PDU is missing or has been misdelivered by the MUX layer. In such a case the invented multiplexer will substitute detected missing packets by empty packets, and add thereto an error indication, e.g. PACKET_MISSING (not shown).

Method 2.

In HDLC any frame that ends with an all "1" bit sequence that is equal to or greater than seven bits in length will be ignored. Therefore, one method to abort a frame in HDLC is to transmit at least seven contiguous "1" bits. Anyhow, H.223 does not support this feature, and therefore a bit sequence of six or more "1" bits inside the packet indicates an obvious transmission error. In such a case the invented multiplexer will forward an error indication to the decoder, e.g. ILLEGAL_BIT_COMBINATION (not shown) and the location of bytes comprising excessive number of contiguous "1" bits.

Method 3.

Since the minimum difference between an HDLC flag and an acceptable bit combination is only one bit (e.g. 0111<u>1</u>110 and 0111<u>0</u>110), changing of one "0" bit to a "1" bit may cause a false flag to appear inside the packet. The MC field in a MUX-PDU header references an entry in the multiplex table, which discloses the logical information channels (audio, video etc.) of the packet and the size of different logical parts. Said size information, anyhow, is not necessarily correct, since the multiplexer at the transmission end may interrupt the transmission of a packet to multiplex some more urgent packets.

Figure 8:
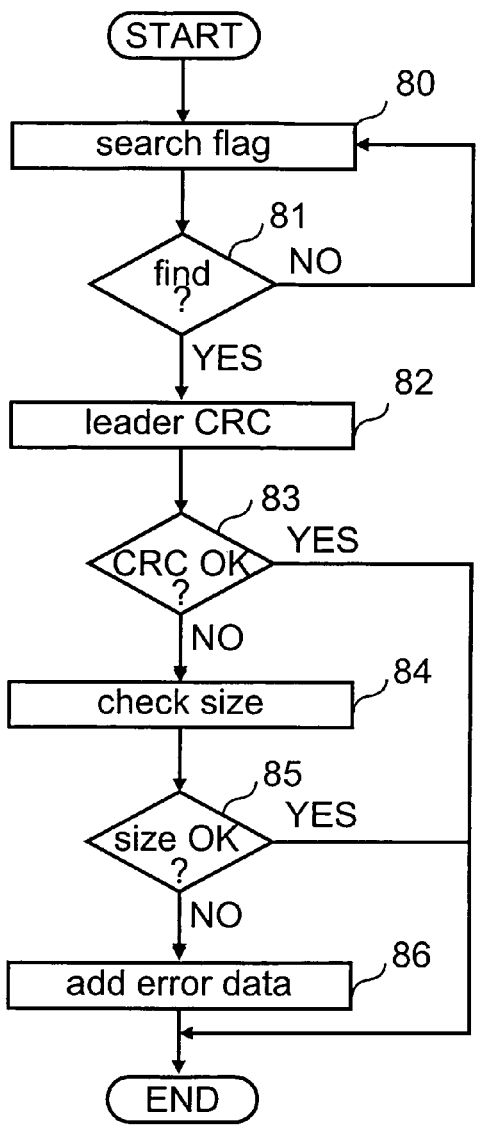
FIG. 8 illustrates an exemplary error detection method for detecting illegal bit combinations.

The flow chart of FIG. 8 illustrates an exemplary error detection method in this case. In case a flag is found (step 81), CRC is carried out for the following bits constituting the assumed header of the next MUX-PDU (step 82). If the header CRC succeeds (step 83), the flag is interpreted to be correct and no error indication is necessary. If the header CRC fails, the expected length of the packet is checked (step 84). If according to the header size information it seems that the packet should be longer (step 85), the invented multiplexer will forward the decoder an error indication, e.g. ILLEGAL_BIT_COMBINATION, and the location of the bytes carrying the false flag (step 86). In the example shown, CRC is used for header error detection. Other error detection types for use with other framing types are possible, as well.

Method 4.

As explained earlier, for certain logical channels, each MUX-SDU may be broken into segments and these segments may be transferred in one or more MUX-PDUs. The end of each MUX-SDU is marked by a one's complemented synchronization flag (H.223 annex B and C) or by a PM field in the MUX-PDU (H.223, H223 annex A). Specifically, when using PM field, it is set to "1" to indicate that the last octet of the previous MUX-PDU was the final octet of the terminating MUX-SDU. In all other circumstances the PM field is set to "0". Since the flag or the PM bit is not included in the header CRC, they add the probability of transmission errors.

At the beginning of the session the terminals negotiate a maximum packet size for both the video and the audio packets. If the PM bit of some previous packet has been erroneous, or some closing flag of a preceding MUX-PDU is lost and some excessive data has been multiplexed to the packet, the amount of data in a received MUX-SDU may exceed said maximum. In such case the invented demultiplexer will store the segmentation points of the MUX-SDU, add an error indication, e.g. CONCATENATED_PACKETS (not shown) and indicate the location of segmentation points. With the help of this data, the decoder can try to locate the missing end point e.g. by searching for the possible start code which appears in the beginning of a video picture. The method can be further improved by arranging the demultiplexer to check the redundancy of a demultiplexed video signal using different combinations of received individual segments. If a correct starting (or ending) point is found, it will be forwarded to the decoder. If sequence numbering is used, the missing starting point can be searched from the beginning of segments. Even if the decoder does not find the end point, which is the case if the closing flag has been lost, it is usually worthwhile to try to utilize as much of the received data as possible, i.e. at least parts that correspond to the negotiated packet size.

Method 5.

The case when the amount of received data for a video packet falls below said negotiated maximum is often based on the fact that the video encoder has stopped coding the packet for an allowable reason. However, it is also possible that a false flag may have appeared, or a PM bit may have been erroneously changed to another. If the packet has been erroneously cut, the bits at the end of the video packet are interpreted as CRC bytes and the CRC of the video packet will probably fail. To avoid such loss, the demultiplexer is adapted to forward the decoder an error indication, e.g. POSSIBLY_SHORT_PACKET (not shown) and the assumed CRC bytes at the end of the packet. The erroneousness of the short packet can be confirmed by checking whether the sequence number of the next packet supports the interpretation. If the decoder deems that the packet has been erroneously cut, it can interpret the CRC bits according to their original purpose and save the packet.

Method 6.

If a framing flag is lost due to transmission errors, a MUX-PDU from a sequence of segmented MUX-SDU will be missing. Also, if the header field fails the CRC, the MUX-PDU will be rejected. In such cases, the CRC of the MUX-SDU will probably indicate an error, since bytes from the lost MUX-PDU are missing from the MUX-SDU. The demultiplexer will be adapted to give the decoder an error indication, e.g. SEGMENT_MISSING (not shown) and the bytes of the location of the missing or rejected MUX-PDUs.

Method 7.

As mentioned earlier, additional "0" bits are added to the packet to avoid more than five consecutive "1" bits inside the packet. If due to a transmission error a "1" bit is changed to a "0" bit, the demultiplexer will not recognize the added "0" bit and will not extract it from the bit stream. Also, if due to a transmission error one "0" bit after four consecutive "1" bits is changed to a "1" bit, the next "0" bit will be removed unnecessarily. In both theses cases, the receiving side will lose the synchronization, and the following correctly received bits will be demultiplexed incorrectly.

A MUX-PDU consists of data units from different media sources (audio, video etc), and these kind of errors cause problems to the information packets in the end of MUX-PDUs. Usually, the MUX-PDU is headed by an audio packet, which comprises a CRC field. Since audio packets are generally not segmented, CRC of the audio data can be carried out directly after demultiplexing. In the invented method, if the CRC of the audio data fails, the timing of the MUX-PDU will be shifted by using bits from the end of the audio packet for the formation of a video packet, or by rejecting extra bits (assumed to be audio bits) from the beginning of the first byte. If any such shifting results in a successful CRC, the transmission error can be considered eliminated.

Figure 9:
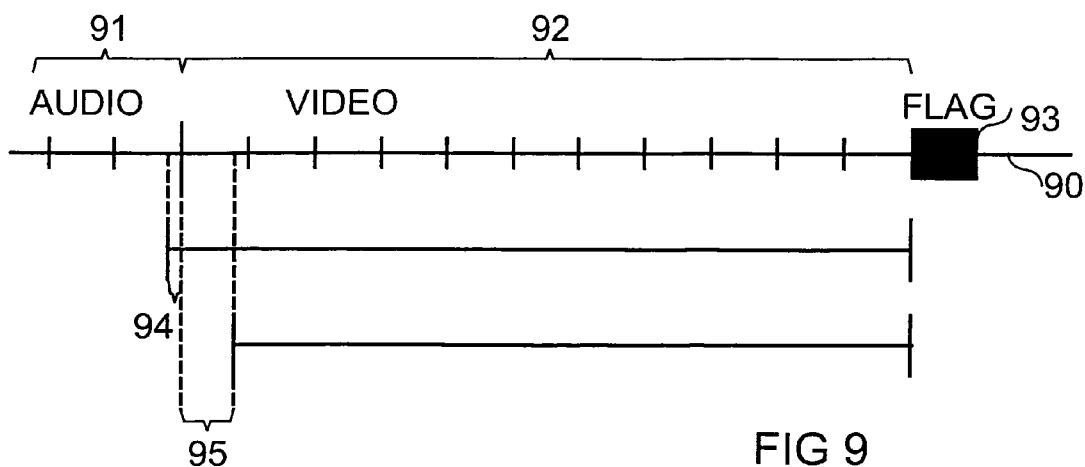
FIG. 9 illustrates the principle of shifting segments of video data in reception.

The principle of this method is illustrated in FIG. 9, where line 90 represents the original packet comprising audio bytes 91, video bytes 92, and the flag 93. If the last byte of the video packet is too short and the audio CRC indicates an error, the error in the video packet can possibly be eliminated by shifting the beginning of the video data unit by bits 94 at the end of the audio packet or by bits 95 at the beginning of the or video data unit. Actual bits do not necessarily have to be moved; it is sufficient to indicate the location of the shifted starting bit to the decoder. In such a case the demultiplexer is therefore adapted to add an error indication, e.g. SHIFTED_SEGMENT (not shown) and the beginning and end points of the shifted segment are counted from the beginning of the packet.

Method 8.

In case the last byte of a MUX-PDU is too short, but the situation described in method 7 is not observed, the MUX-PDU suffers from HDLC "0" bit error. If the video packet is segmented (which usually is the case) the possible error affecting the whole video packet can be located to said segment. In such a case the demultiplexer is adapted to add an error indication, e.g. CORRUPTED_SEGMENT (not shown) with the beginning and end points of said corrupted segments.

Some of the possible alternatives of the decoder for utilizing the error information forwarded by the demultiplexer have been discussed with relevant error detection method descriptions. The final algorithm for error recovery used by the decoder depends on the chosen combination of possible error indications, and will not be further discussed here.

It is to be understood that the present invention may be embodied with other changes, improvements and modifications that may occur to those skilled in the art, without departing from the scope of the invention defined in the appended claims.

What is claimed is:

1. A method of demultiplexing a multiplexed signal, said multiplexed signal comprising packet data units, the packet data units including data packets belonging different logical channels, the packet data units being delimited by framing flags, the method comprising:

searching for said framing flags from a received multiplexed signal and de-framing the packet data units with reference to the framing flags;

demultiplexing the data packets belonging to the different logical channels from the packet data units and assembling them into demultiplexed signals, detecting invalidity of a demultiplexed signal by examining errors encountered while de-framing the packet data units;

adding error location to the demultiplexed signal, the error location information indicating the location of erroneous bits in the demultiplexed signal; and forwarding a demultiplexed—signal to a corresponding decoder for the logical channel and further providing the decoder with an error type indication—for use by the decoder during decoding of the demultiplexed signal to enable recovery from the error.

2. A method according to claim 1, wherein the error location information comprises a table of error locations.

3. A method according to claim 1, wherein if the determination of the location of erroneous bits in the demultiplexed signal fails, a general error indication is forwarded to the decoder.

4. A method according to claim 1, further comprising adding the error type indication to the demultiplexed signal.

5. A method according to claim 1, wherein the error location information comprises a table of error locations.

6. A method according to claim 1, wherein said framing flags are HDLC flags used in HDLC-type framing.

7. A method according to claim 1, wherein said framing flags are PN flags used in PN-type framing.

8. A method according to claim 1, wherein the step of detecting invalidity of a demultiplexed signal by examining errors encountered while de-framing the packet data units comprises:

assembling data packets belonging to a particular logical channel into a data segment having an associated sequence number; and checking the validity of said sequence number in order to determine whether a data packet belonging to said particular logical channel is missing.

9. A method according to claim 8, wherein said data segment is an AL-PDU.

10. A method according to claim 8, wherein when it is determined that a data packet belonging to said particular logical channel is missing, the method further comprises substituting the missing data packet with an empty data packet.

11. A method according to claim 8, wherein when it is determined that a data packet belonging to said particular logical channel is missing, an error type indication indicative of a missing data packet is forwarded to the corresponding decoder for the particular logical channel.

12. A method according to claim 1, wherein the step of detecting invalidity of a demultiplexed signal by examining errors encountered while de-framing the packet data units comprises checking for illegal bit combinations in a packet data unit.

13. A method according to claim 1, wherein the step of detecting invalidity of a demultiplexed signal by examining errors encountered while de-framing the packet data units comprises checking an assumed header portion of a packet data unit for errors.

14. A method according to claim 1, wherein the step of detecting invalidity of a demultiplexed signal by examining errors encountered while de-framing the packet data units comprises:
assembling data packets belonging to a particular logical channel into a data segment; and
checking the length of said data segment against a predetermined maximum length for said data segment.

15. A method according to claim 14, wherein when it is determined that the length of said data segment exceeds said predetermined maximum length, an error type indication indicative of a concatenation of data packets is forwarded to the corresponding decoder for the particular logical channel.

16. A method according to claim 14, wherein the data segment is a MUX-SDU.

17. A method according to claim 1, wherein the step of detecting invalidity of a demultiplexed signal by examining errors encountered while de-framing the packet data units comprises searching for a shifted location of the starting point of a data packet belonging to a particular logical channel.

18. A method according to claim 17, wherein when it is determined that the starting point of a data packet belonging to a particular logical channel is shifted, an error type indication indicative of a shifted data packet is forwarded to the corresponding decoder for the particular logical channel.

19. A method according to claim 18, wherein when it is determined that the starting point of a data packet belonging to a particular logical channel is shifted, the method further comprises indicating the shifted location of the starting point of the data packet to the corresponding decoder for the particular logical channel.

20. A method according claim 1, wherein the step of detecting invalidity of a demultiplexed signal by examining errors encountered while de-framing the data units comprises checking information in the packet data unit relating to the size of the data belonging to the different logical channels.

21. A device for demultiplexing a multiplexed signal, said multiplexed signal comprising packet data units, the packet data units including data packets belonging to different logical channels, the packet data units being delimited by framing flags, said device comprising:
an input for receiving the multiplexed signal,
a processor; and
a set of outputs for forwarding demultiplexed signals to corresponding decoders,
the device being arranged to:
search for said framing flags from a received multiplexed signal and to de-frame the packet data units with reference to the framing flags;
demultiplex the data packets belonging to different logical channels from the packet data units and assemble them into demultiplexed signals,
detect invalidity of a demultiplexed signal by examining errors encountered while de-framing the packet data units;
add error location information to the demultiplexed signal, the error location information indicating the location of erroneous bits in the demultiplexed signal; and
forward an invalid demultiplexed signal to the corresponding decoder for the logical channel and further provide the decoder with an error type indication for use by the decoder during decoding of the demultiplexed signal to enable recovery from the error.

22. A device according to claim 21, arranged to forward a general error indication to the decoder if the determination of the location of erroneous bits in the demultiplexed signal fails.

23. A device according to claim 21, further arranged to add the error type indication to the demultiplexed signal.

24. A device according to claim 21, arranged to detect invalidity of a demultiplexed signal by assembling data packets belonging to a particular logical channel into a data segment having an associated sequence number and checking the validity of said sequence number in order to determine whether a data packet belonging to said particular logical channel is missing.

25. A device according to claim 24, arranged to substitute a missing data packet with an empty data packet.

26. A device according to claim 24, arranged to forward an error type indication indicative of a missing data packet to the corresponding decoder when it is determined that a data packet belonging to said particular logical channel is missing.

27. A device according to claim 21, arranged to detecting invalidity of a demultiplexed signal by checking for illegal bit combinations in a packet data unit.

28. A device according to claim 21, arranged to detect invalidity of a demultiplexed signal by checking an assumed header portion of a packet data unit for errors.

29. A device according to claim 21, arranged to detect invalidity of a demultiplexed signal by:
assembling data packets belonging to a particular logical channel into a data segment; and
checking the length of said data segment against a predetermined maximum length for said data segment.

30. A device according to claim 29, arranged to forward an error type indication indicative of a concatenation of data packets to the corresponding decoder for the logical channel when it is determined that the length of said data segment exceeds said predetermined maximum length.

31. A device according to claim 21, arranged to detect invalidity of a demultiplexed signal by searching for a shifted location of the starting point of a data packet belonging to a particular logical channel.

32. A device according to claim 31, arranged to forward an error type indication indicative of a shifted data packet to the corresponding decoder for the particular logical channel when it is determined that the starting point of a data packet belonging to a particular logical channel is shifted.

33. A device according to claim 32, arranged to indicate the shifted location of the starting point of the data packet to the corresponding decoder for the particular logical channel.

34. A device according to claim 21, arranged to determine the error location information by analysing de-framing data obtained by de-framing more than one contiguous packet data unit.

35. A device according claim 21, arranged to detect invalidity of a demultiplexed signal by checking information in the packet data unit relating to the size of the data belonging to the different logical channels.

36. A multimedia terminal comprising a demultiplexor for demultiplexing a multiplexed signal, said multiplexed signal comprising packet data units including data packets belonging to different logical channels, the packet data units being delimited by framing flags, said demultiplexor comprising:
an input for receiving a multiplexed signal;
a processor; and
a set of outputs for forwarding demultiplexed signals to corresponding decoders,
the multiplexor being arranged to:
search for said framing flags from a received multiplexed signal and to de-frame the packet data units with reference to the framing flags;
demultiplex the data packets belonging to different logical channels from the packet data units and assemble them into demultiplexed signals,
detect invalidity of a demultiplexed signal by examining errors encountered while de-framing the packet data units;
add error location information to the demultiplexed signal, the error location information indicating the location of erroneous bits in the demultiplexed signal; and
forward a invalid demultiplexed signal to the corresponding decoder for the logical channel and further provide the decoder with an error type indication for use by the decoder during decoding of the demultiplexed signal to enable recovery from the error.

37. A multimedia terminal according to claim 36, further comprising a video decoder, wherein the video decoder is adapted to use error type indications provided by the demultiplexor to conceal errors in a demultiplexed video data signal.

38. A multimedia terminal according to claim 36, comprising a video decoder, wherein the video decoder is adapted to use error location information provided by the demultiplexor to conceal errors in a demultiplexed video data signal.

* * * * *